United States Patent [19]

Reiher et al.

[11] Patent Number: 5,405,415

[45] Date of Patent: Apr. 11, 1995

[54] WATER-SOLUBLE DISAZO COMPOUNDS, PROCESS FOR THEIR PREPARATION AND THEIR USE AS DYES

[75] Inventors: Uwe Reiher, Hofheim; Werner H. Russ, Flörsheim, both of Germany

[73] Assignee: Hoechst AG, Frankfurt, Germany

[21] Appl. No.: 264,592

[22] Filed: Jun. 23, 1994

[30] Foreign Application Priority Data

Jun. 26, 1993 [DE] Germany .................. 43 21 414.2

[51] Int. Cl.[6] ........................................... C09B 62/513
[52] U.S. Cl. ........................................... 8/549; 8/641; 534/637; 534/641
[58] Field of Search .................... 534/637, 641; 8/549, 8/641

[56] References Cited

U.S. PATENT DOCUMENTS

| | | | |
|---|---|---|---|
| 4,072,463 | 2/1978 | Schaläfer et al. | 8/41 B |
| 5,093,484 | 3/1992 | Herd | 534/642 |
| 5,227,475 | 7/1993 | Büch et al. | 534/629 |

FOREIGN PATENT DOCUMENTS

| | | |
|---|---|---|
| 0068204 | 6/1982 | European Pat. Off. |
| 0122600 | 4/1984 | European Pat. Off. |
| 0292825A2 | 5/1988 | European Pat. Off. |
| 559617 | 2/1993 | European Pat. Off. |
| 2655995 | 12/1990 | France . |
| 3930704A1 | 9/1989 | Germany . |
| 918416 | 2/1963 | United Kingdom . |
| 2239025 | 12/1990 | United Kingdom . |

*Primary Examiner*—Paul Lieberman
*Assistant Examiner*—Margaret Ernsmann
*Attorney, Agent, or Firm*—Connolly and Hutz

[57] ABSTRACT

Water-soluble fiber-reactive disazo compounds of the formula (1) given and defined below are described, which compounds serve as dyes for dyeing and printing hydroxy- and/or carboxamido-containing material, in particular fiber material, such as wool and synthetic polyamide and, in particular, cellulose fiber materials, such as cotton.

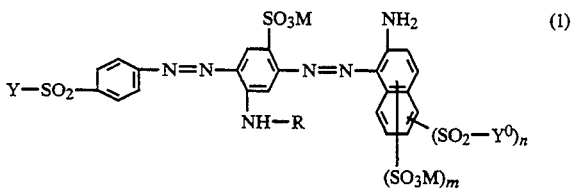

In this formula M is hydrogen or an alkali metal, the groups Y—SO$_2$— and —SO$_2$—Y$^0$ are fiber-reactive groups from the vinylsulfone series, m is 1 or 2, n is zero or 1, R is a group of the formula (2) or (3)

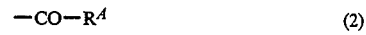

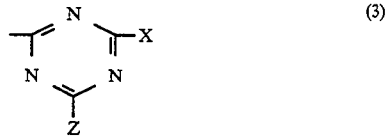

in which R$^4$ is lower alkyl which may be substituted, or is phenyl which may be substituted by sulfo, carboxy, lower alkyl and/or lower alkoxy, X is chlorine, fluorine, hydroxy, alkoxy, cycloalkoxy or alkoxy of 3 to 8 carbon atoms whose alkyl radical is interrupted by —O—, —NH—, —CO—NH— or —NH—CO—, or is benzyloxy, sulfomethoxy, β-sulfoethoxy, amino, alkylamino, cycloalkylamino or alkylamino of 3 to 8 carbon atoms whose alkyl radical is interrupted by one of the abovementioned hereto groups, or is benzylamino, sulfomethylamino, β-sulfoethylamino or cyanoamino, Z is chlorine, fluorine or a group of the formula (4a), (4b), (4c) or (4d).

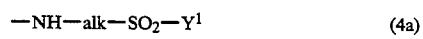

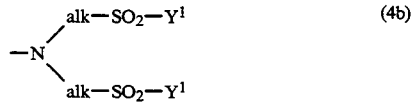

-continued

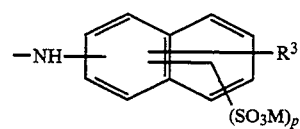

-continued

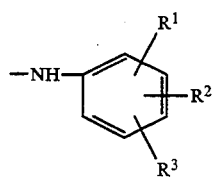

in which alk is alkylene which is interrupted by one or two of the abovementioned hetero groups, the group —$SO_2$—$Y^1$ is a fiber-reactive group from the vinylsulfonyl series, $R^1$ is hydrogen, carboxy, sulfo or a fiber-reactive group from the vinylsulfone series, $R^2$ is hydrogen, lower alkyl, lower alkoxy, chlorine, bromine, carboxy, sulfo or nitro, $R^3$ is hydrogen, lower alkyl, lower alkoxy, chlorine, bromine, carboxy or sulfo, and p is 1 or 2.

11 Claims, No Drawings

WATER-SOLUBLE DISAZO COMPOUNDS, PROCESS FOR THEIR PREPARATION AND THEIR USE AS DYES

The invention is in the technical field of fiber-reactive dyes.

The practice of dyeing with fiber-reactive dyes has led to increased demands on the quality of the dyeings and the economy of the dyeing processes. As a result thereof, there is a continuing need for novel fiber-reactive dyes having improved properties. Especially for ecological reasons, there is an increasing demand for heavy-metal-free dyes. It is true that European Patent Application Publication No. 0,292,825 discloses heavy-metal-free disazo dyes containing a fiber-reactive diazo component, but, owing to the increased demands on the fastness profile of heavy-metal-free fiber-reactive dyes, specifically in the violet region, the fastness properties of these dyes are in need of improvement.

The present invention, then, provides novel, improved disazo compounds having the formula (1):

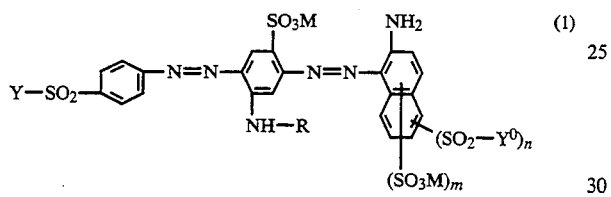

In this formula:

M is hydrogen or an alkali metal, such as sodium, potassium and lithium;

Y is vinyl or is ethyl which is substituted in the $\beta$-position by a substituent which can be eliminated by reaction with alkali to give the vinyl group;

$Y^0$ is vinyl or is ethyl which is $\beta$-substituted by a substituent which can be eliminated by reaction with alkali to give the vinyl group; zero, 1 or 2;

n is zero or 1 (this group being hydrogen if n is zero);

R is a group of the formula (2) or (3)

in which $R^A$ is alkyl of 1 to 6 carbon atoms, preferably methyl, ethyl or propyl, and, in particular, methyl, or alkyl of 2 to 6 carbon atoms which is substituted, for example, by chlorine, sulfo or carboxy, or is a phenyl radical which may be substituted by 1, 2 or 3 substituents, preferably 1 or 2 substituents, from the group comprising sulfo, carboxy, alkyl of 1 to 4 carbon atoms, such as methyl and ethyl, and alkoxy of 1 to 4 carbon atoms, such as methoxy and ethoxy, X is chlorine, fluorine, hydroxy, alkoxy of 1 to 10 carbon atoms, preferably of 1 to 4 carbon atoms, such as propoxy, ethoxy and methoxy, or is cycloalkyloxy of 5 to 8 carbon atoms or alkoxy of 3 to 8 carbon atoms, the alkyl radical being interrupted by one or two hetero groups selected from the groups comprising —O—, —NH—, —CO—NH— and —NH—CO—, of these preferably —O— and —NH—, or is benzyloxy, sulfomethoxy, $\beta$-sulfoethoxy, amino, alkylamino of 1 to 10 carbon atoms, preferably of 1 to 4 carbon atoms, such as propylamino, ethylamino and methylamino, or is cycloalkylamino of 5 to 8 carbon atoms, such as cyclohexylamino, or alkylamino of 3 to 8 carbon atoms, the alkyl radical being interrupted by one or two hetero groups selected from the groups comprising —O—, —NH—, —CO—NH— and —NH—CO—, of these preferably —O— and —NH—, or is benzylamino, sulfomethylamino, $\beta$-sulfoethylamino or cyanoamino and is preferably fluorine, chlorine and cyanoamino, and Z is chlorine, fluorine or a group of the formula (4a), (4b), (4c) or (4d)

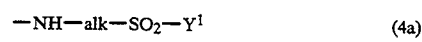

in which alk is alkylene of 1 to 8 carbon atoms, preferably of 2 to 4 carbon atoms, the alkylene being preferably straight-chain, or is alkylene of 3 to 8 carbon atoms which is interrupted by one or two hetero groups selected from the groups comprising —O—, —NH—, —CO—NH— and —NH—CO—, of these preferably —O— and —NH—, $Y^1$ is vinyl or ethyl which is substituted in the $\beta$-position by a substituent which can be eliminated by alkali to give the vinyl group, $R^1$ is hydrogen, carboxy, sulfo or a group of the formula —$SO_2$—$Y^1$ where $Y^1$ has the abovementioned meaning, $R^2$ is hydrogen, alkyl of 1 to 4 carbon atoms, such as ethyl and, in particular, methyl, alkoxy of 1 to 4 carbon atoms, such as ethoxy and, in particular, methoxy, chlorine, bromine, carboxy, sulfo or nitro, and preferably hydrogen, alkyl of 1 to 4 carbon atoms, alkoxy of 1 to 4 carbon atoms or sulfo, $R^3$ is hydrogen, alkyl of 1 to 4 carbon atoms, such as ethyl and, in particular, methyl, alkoxy of 1 to 4 carbon atoms, such as ethoxy and, in particular, methoxy, chlorine, bromine, carboxy or sulfo, and preferably hydrogen, alkoxy of 1 to 4 carbon atoms or sulfo, M has one of the abovementioned meanings, and p is 1 or 2, the radical Z in formula (3) preferably not being a radical containing a group of the formula —$SO_2$—$Y^1$ if n is 1.

In the abovementioned formulae, the individual formula members can, within their range of meanings, have meanings which are identical to or different from one another.

Examples of substituents which can be eliminated by alkali and are in the β-position of the ethyl group of Y, $Y^0$ and $Y^1$ are halogen atoms, such as bromine and chlorine, ester groups of organic carboxylic and sulfonic acids, such as alkylcarboxylic acids, substituted or unsubstituted benzenecarboxylic acids and substituted or unsubstituted benzenesulfonic acids, such as the groups alkanoyloxy of 2 to 5 carbon atoms, of these in particular acetyloxy, benzoyloxy, sulfobenzoyloxy, phenylsulfonyloxy and toluenesulfonyloxy, furthermore acid ester groups of inorganic acids, such as phosphoric acid, sulfuric acid and thiosulfuric acid (phosphato, sulfato, and thiosulfato groups), likewise dialkylemino groups having alkyl groups each containing 1 to 4 carbon atoms, such as dimethylamino and diethylamino. Preferably, Y, $Y^0$ and $Y^1$ are β-chloroethyl, β-sulfatoethyl or vinyl.

The groups "sulfo", "carboxy", "thiosulfato", "phosphato" and "sulfato" include not only their acid form but also their salt form. Accordingly, sulfo groups are groups of the formula —$SO_3M$, carboxy groups are groups of the formula —COOM, thiosulfato groups are groups of the formula —S—$SO_3M$, phosphato groups are groups of the formula —$OPO_3M_2$, and sulfato groups are groups of the formula —$OSO_3M$, in which M has the abovementioned meaning.

The present invention also provides mixtures of disazo compounds of the formula (1), in particular mixtures containing disazo compounds of the formulae (1A) and (1B) given below, in which the individual formula members have the abovementioned meanings. Of these, those mixtures are of particular interest which contain 2 to 4 disazo compounds of the formulae (1A) and (1B), these disazo compounds being preferably selected from one or two disazo compounds from the group of disazo compounds of the formula (1A) and from one or two disazo compounds from the group of disazo compounds of the formula (1B).

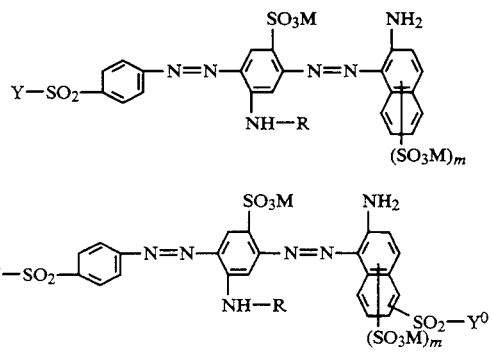

Typically, the disazo compounds of the formula (1A) and the disazo compounds of the formula (1B) are present in a mixing ratio of 5:95 to 95:5% by weight, preferably in a mixing ratio of 30:70 to 70:30% by weight. These mixtures can be present in solid form, for example as powders, or in the form of an aqueous, preferably concentrated, solution as "liquid preparation", which may contain a buffer substance capable of maintaining a pH of between 3 and 7, such as are disclosed, for example, in U.S. Pat. Nos. 4,072,463 and 4,448,583.

The present invention also provides a process for preparing the disazo compounds of the formula (1) according to the invention, which comprises diazotizing a compound of the formula (5)

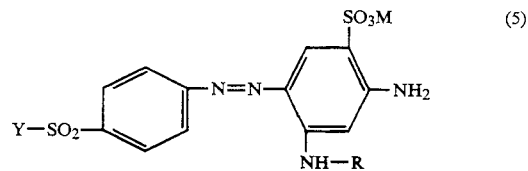

in which Y, R and M have the abovementioned meanings, and coupling the resulting diazonium salt onto a compound of the formula (6)

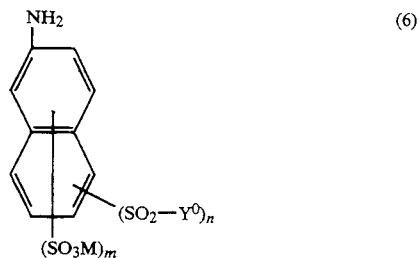

in which $Y^0$, M, m and n have the abovementioned meanings The diazotization and coupling reactions are carried out by known procedures, for example diazotization being typically carried out at a temperature of between —5° C. and +50° C and at a pH below 2 using a strong acid and alkali metal nitrite in a, preferably, aqueous medium and the coupling reaction typically at a temperature of between 0° and 60° C. and at a pH of between 1.5 and 4 in a, preferably, aqueous medium.

Examples of starting compounds of the formula (6) are 2-aminonaphthalene-5,7-disulfonic acid, 2-aminonaphthalene-6,8-disulfonic acid, 2-aminonaphthalene-3,6-disulfonic acid, 6-(β-sulfatoethylsulfonyl)-2-aminonaphthalene, 8-sulfo-6-(β-sulfatoethylsulfonyl)-2-aminonaphthalene, 8-(β-sulfatoethylsulfonyl)-2-aminonaphthalene, 6-sulfo-S-(β-sulfatoethylsulfonyl)-2-aminonaphthalene, 5-sulfo-2-aminonaphthalene, 6-sulfo-2-aminonaphthalene, 7-sulfo-2-aminonaphthalene and 8-sulfo-2-aminonaphthalene.

The starting monoazo compounds of the formula (5) can be prepared in a known manner by coupling a compound of the formula (7)

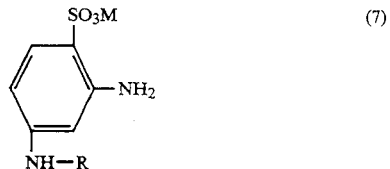

in which M and R have the abovementioned meanings under customary diazotization and coupling conditions onto the diazonium salt of the aniline compound of the formula (8)

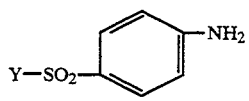 (8)

in which Y has the abovementioned meaning.

The starting compounds which are used for synthesizing the disazo compounds of the formula (1) according to the invention, such as, for example, the compounds of the formulae (7), (8), H-X and H-Z, are known and in part described in the literature in large numbers.

Mixtures of disazo compounds of the formula (1A) and the formula (1B) can be prepared in the usual manner by mechanical mixing of the individual dyes or chemically by coupling the diazonium salts of one or more, such as one or two, monoazo compounds of the formula (5) in one reaction batch onto one or more, such as one or two, coupling components of the formula (6), in which n is zero, and onto one or more, such as one or two, coupling components of the formula (6), in which n is 1, in the molar ratio desired in each case.

Precipitation and isolation of the compounds of the formula (1) prepared according to the invention from the synthesis solutions can take place by generally known methods, such as, for example, either by precipitation from the reaction medium by means of electrolytes, such as, for example, sodium chloride or potassium chloride, or by evaporation of the reaction solution, for example spray-drying, in which case a buffer substance can be added to this reaction solution.

The compounds of the formula (1) according to the invention have fiber-reactive properties and possess very good dye properties. Accordingly, they can be used for dyeing (including printing) hydroxy-containing and/or carboxamido-containing materials. Likewise, the solutions formed in the synthesis of the compounds according to the invention can be used, if appropriate after addition of a buffer substance, if appropriate also after concentration, directly for dyeing as a liquid preparation.

Accordingly, the present invention also relates to the use of the compounds of the formula (1) according to the invention individually or as a mixture for dyeing (including printing) hydroxy- and/or carboxamido-containing materials and to processes for applying them to these substrates for dyeing purposes. The materials are preferably used in the form of fiber materials, in particular in the form of textile fibers, such as yarns, packages and fabrics. This can be done by known procedures.

Hydroxy-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon-6.6, nylon-6, nylon-11 and nylon-4.

In accordance with the application according to the invention, the compounds of the formula (1) according to the invention can be applied to the substrates mentioned, in particular the fiber materials mentioned, and fixed thereon by the application techniques known for water-soluble dyes, in particular fiber-reactive dyes, by, for example, applying the disazo compound(s) of the formula (1) to the substrate in dissolved form or incorporating them therein and fixing them thereon or therein by application of heat or by reaction with an alkaline agent or by both measures. Such dyeing and fixation methods have been described in large numbers not only in the technical literature but also in the patent literature, such as, for example, in European Patent Application Publication No. 0,181,585A.

Compounds (1) produce dyeings and prints at a high color yield and good color buildup not only on carboxamido-containing materials, such as, in particular, on wool, but also on hydroxy-containing material, such as, in particular, cellulose fiber material. The dyeings and prints possess good fastness properties, such as, in particular, good light and wet fastness properties, of which the good light fastness properties may be mentioned in particular.

The azo dyes according to the invention are preferably used for dyeing cellulose fiber materials. Of the good fastness properties obtainable thereupon, in particular the wash fastness properties at 60° to 95° C., even in the presence of perborates, the acid and alkaline fulling, cross-dyeing and perspiration fastness properties, the light fastness of the dyeing not only when dry but also when wetted with drinking water or an acid or alkaline perspiration solution, the alkali, acid, water and seawater fastness properties, and the good acid fading of stored, moist, acid-containing dyed material (see DE-B-2,322,236, column 4, lines 35 to 42) may be mentioned. Furthermore, the good rub, pleating and hotpress fastness properties may be mentioned.

It is to some extent advantageous if the disazo compounds according to the invention are present as mixtures corresponding to the formulae (1A) and (1B). For example, the mixtures according to the invention surprisingly usually show a higher fixation level compared with the individual dyes of the formula (1A), which is advantageous especially from an ecological point of view. Compared with the individual dyes of the formula (1B), the mixtures in general have improved water solubility.

The Examples which follow serve to illustrate the invention. Parts and percentages are by weight unless stated otherwise. Parts by weight relate to parts by volume as the kilogram relates to the liter.

The compounds described in these Examples by way of the formulae are given in the form of the free acids; in general, they are prepared and isolated in the form of their alkali metal salts and are used for dyeing in the form of these salts. Likewise, the starting compounds and components mentioned in the Examples which follow, in particular the Table Examples, in the form of the free acid can be used in the synthesis as such or in the form of their salts, preferably their alkali metal salts.

The absorption maxima ($\lambda_{max}$ values) given for the visible region were determined using aqueous solution of the alkali metal salts. In the Table Examples, the $\lambda_{max}$ values are put in brackets next to the hue; the wavelength is given in nm.

EXAMPLE 1

28.1 parts of 4-(β-sulfatoethylsulfonyl)aniline are diazotized in the usual manner in aqueous medium (40 parts of water) using 26.5 parts of concentrated aqueous hydrochloric acid and 17.5 parts of a 40% aqueous sodium nitrite solution, and excess nitrous acid is then destroyed with a small amount of sulfamic acid. 23 parts of 2-sulfo-5-acetylaminoaniline are added to this diazonium salt solution, and the batch is brought to a pH of 3 with sodium carbonate. In order to complete the coupling reaction, the batch is first stirred at 20° C. for 30 minutes and then at 55° C. for about 3 hours, then cooled to about 0° C. with ice, followed by addition of 25 parts of concentrated aqueous hydrochloric acid and diazotization with 16 parts of 40% aqueous sodium nitrite solution. Excess nitrous acid is destroyed with a small amount of sulfamic acid. 30.3 parts of 2-aminonaphthalene-5,7-disulfonic acid are added, the batch is brought to a pH between 5 and 5.5 with sodium carbonate and stirring is continued for about 16 hours to complete the coupling reaction.

The disazo compound according to the invention which, written in the form of the free acid, has the formula

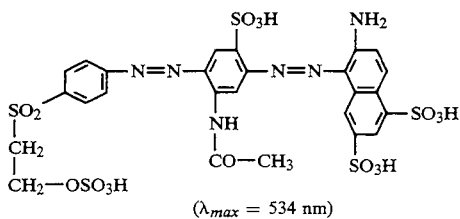

($\lambda_{max}$ = 534 nm)

is isolated in the usual manner, for example by evaporation of the synthesis solution. It exhibits very good fiber-reactive dye properties and produces strong violet dyeings and prints having good fastness properties, of which in particular the good light fastness may be mentioned, on materials mentioned in the description, such as, in particular, cotton, by the application and fixation methods customary in the art for fiber-reactive dyes.

EXAMPLE 2

To prepare a disazo compound according to the invention, the method of Example 1 is followed, except that in the second coupling reaction 33.1 parts of 6-($\beta$-sulfatoethylsulfonyl)-2-aminonaphthalene are used as the coupling component instead of the second coupling component mentioned there and this second coupling reaction is carried out at a pH between 4.5 and 5.

The disazo compound according to the invention which, written in the form of the free acid, has the formula

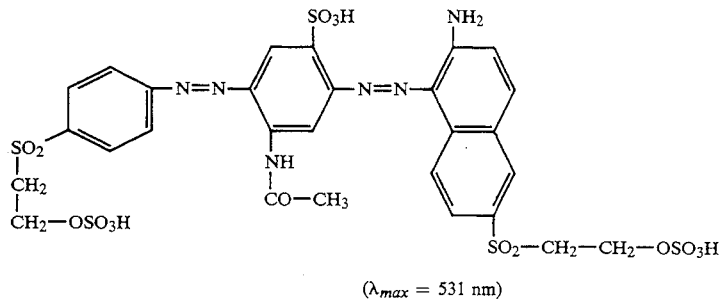

($\lambda_{max}$ = 531 nm)

is isolated in the usual manner, for example by salting out with sodium chloride. It exhibits good dye properties and produces strong violet dyeings and prints having good fastness properties, of which in particular the good light fastness may be mentioned, on the fiber materials mentioned in the description, such as, for example, cotton, by the dyeing and printing methods customary in the art for fiber-reactive dyes.

EXAMPLE 3

To prepare a disazo compound according to the invention, the method of Example 1 is followed, except that in the second coupling reaction 41.1 parts of 8-sulfo-6-($\beta$-sulfatoethylsulfonyl)-2-aminonaphthalene are used as the coupling component instead of the second coupling component mentioned there and this second coupling reaction is carried out at a pH between 4.5 and 5.

The disazo compound according to the invention which, written in the form of the free acid, has the formula

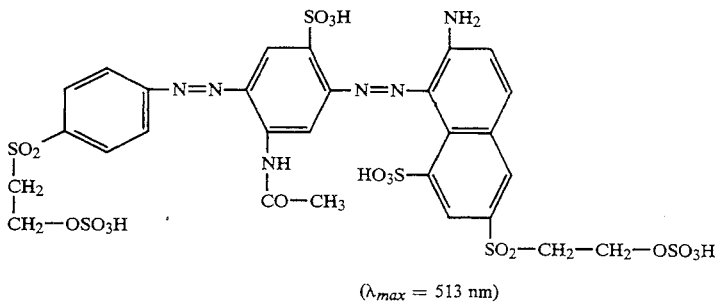

($\lambda_{max}$ = 513 nm)

is isolated in the usual manner, for example by salting out with potassium chloride. It exhibits good dye properties and produces strong red-brown dyeings and prints having good fastness properties, of which in particular the good light fastness may be mentioned, on fiber materials mentioned in the description, such as, for example, cotton, by the dyeing and printing methods customary in the art for fiber-reactive dyes.

EXAMPLE 4 a) 4.2 parts of cyanamide are added to a suspension of 18.4 parts of cyanuric chloride in 200 parts of water and 200 parts of ice. The pH is brought to 9 with concentrated sodium hydroxide solution, and stirring of the batch at 0° to 3° C. is continued for about 2 hours while maintaining a pH of 9. Dilute aqueous hydrochloric acid is then added until a pH of 2 is reached, 17.3 parts of aniline-3-sulfonic acid are added to the batch, stirring is continued for about 2 hours, 18.8 parts of 1,3-diaminobenzene-4-sulfonic acid are then added, and the reaction is brought to completion at 45° C. The batch is then cooled to room temperature.

b) A diazonium salt solution is prepared from 28.1 parts of 4-(β-sulfatoethylsulfonyl)aniline by the procedure of Example 1, 47.8 parts of the compound 2-sulfo-5-[2'-(3''-sulfophenyl)amino-4'-cyanoamino-1',3',5'-triazin-6'-yl]aminoaniline prepared under a) and serving as the coupling component are then added, and the coupling reaction is carried out in a manner known per se. The reaction solution is then cooled to about 0° C. with ice, and 25 parts of aqueous concentrated hydrochloric acid are added. The resulting aminoazo compound is diazotized by adding 17.5 parts of a 40% aqueous sodium nitrite solution. After destroying excess nitrous acid with a small amount of sulfamic acid, 30.3 parts of 2-aminonaphthalene-5,7-disulfonic acid are added, the pH is brought to 5 with sodium carbonate, and stirring is continued for about 16 hours.

The resulting disazo compound according to the invention is isolated in the usual manner, for example by evaporation of the synthesis solution. Written in the form of the free acid, it has the formula

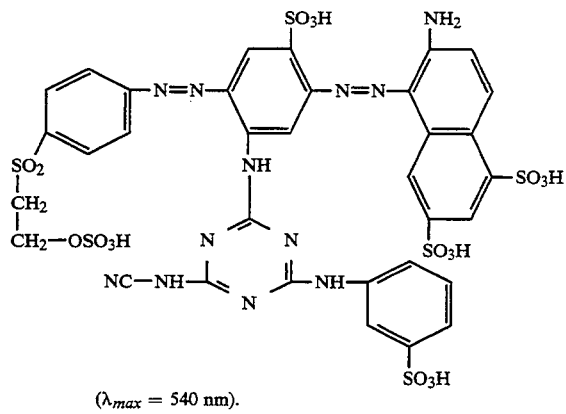

($\lambda_{max}$ = 540 nm).

The disazo compound according to the invention exhibits very good fiber-reactive dye properties and produces strong bluish red dyeings and prints having good fastness properties, of which in particular the good light fastness may be mentioned, on, for example, cellulose fiber materials, such as cotton, by the application methods customary for fiber-reactive dyes.

EXAMPLES 5 TO 55

In the Table Examples which follow, further disazo compounds of the formula (A) according to the invention

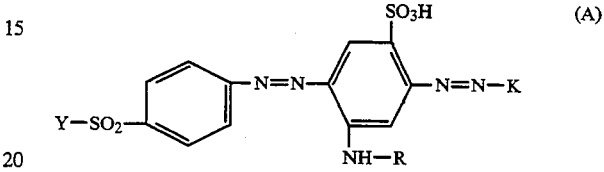

are described by means of their components. They can be prepared by the procedure according to the invention, for example in accordance with one of the above Examples, using the components apparent from the particular Table Example in conjunction with the formula (A) (such as the diazo component of the formula Y—SO$_2$-phenylene-NH$_2$, the diazotizable first coupling component 2-sulfo-5-acylaminoaniline or 1,3-diaminobenzene-6-sulfonic acid, cyanuric chloride or cyanuric fluoride, an amine of the formula H-X, an amine of the formula H-Y and the second coupling component of the formula H-K). They exhibit very good fiber-reactive dye properties and dye the materials mentioned in the description, such as, in particular, cellulose fiber materials, for example cotton, in the hue given in the particular Table Example (here for cotton), the dyeings having high color strength and good fastness properties.

| Ex. | Radical Y | Radical R | Radical K | Hue |
|---|---|---|---|---|
| 5 | β-Sulfatoethyl | Formula (3):<br>X = Cyanoamino,<br>Y = 2-Sulfophenylamino | 5,7-Disulfo-2-aminonaphth-1-yl | bluish red (538) |
| 6 | β-Sulfatoethyl | Formula (3):<br>X = Cyanoamino,<br>Y = 4-Sulfophenylamino | 5,7-Disulfo-2-aminonaphth-1-yl | bluish red (541) |
| 7 | β-Sulfatoethyl | Formula (3):<br>X = Cyanoamino,<br>Y = 3-(β-Sulfatoethylsulfonyl)-<br>phenylamino | 5,7-Disulfo-2-aminonaphth-1-yl | bluish red (537) |
| 8 | β-Sulfatoethyl | Formula (3):<br>X = Cyanoamino,<br>Y = 2-Methoxy-5-(β-sulfatoethyl-<br>sulfonyl)phenylamino | 5,7-Disulfo-2-aminonaphth-1-yl | bluish red (538) |

-continued

| Ex. | Radical Y | Radical R | Radical K | Hue |
|---|---|---|---|---|
| 9 | β-Sulfatoethyl | Formula (3):<br>X = Cyanoamino,<br>Y = 4-(β-Sulfatoethylsulfonyl)-phenylamino | 5,7-Disulfo-2-aminonaphth-1-yl | bluish red (540) |
| 10 | β-Sulfatoethyl | Formula (3):<br>X = Fluorine,<br>Y = 3-Sulfophenylamino | 5,7-Disulfo-2-aminonaphth-1-yl | bluish red (539) |
| 11 | β-Sulfatoethyl | Formula (3):<br>X = Fluorine,<br>Y = 4-(β-Sulfatoethylsulfonyl)-phenylamino | 5,7-Disulfo-2-aminonaphth-1-yl | bluish red (538) |
| 12 | β-Sulfatoethyl | Formula (3):<br>X = Fluorine,<br>Y = 2-Methoxy-5-(β-sulfatoethylsulfonyl)phenylamino | 5,7-Disulfo-2-aminonaphth-1-yl | bluish red (538) |
| 13 | β-Sulfatoethyl | Formula (3):<br>X = Fluorine,<br>Y = γ-(β'-Sulfatoethylsulfonyl)-propylamino | 5,7-Disulfo-2-aminonaphth-1-yl | bluish red (536) |
| 14 | β-Sulfatoethyl | Formula (3):<br>X = Fluorine,<br>Y = γ-(β'-Chloroethylsulfonyl)-propylamino | 5,7-Disulfo-2-aminonaphth-1-yl | bluish red (539) |
| 15 | β-Sulfatoethyl | Formula (3):<br>X = Fluorine,<br>Y = λ-(Vinylsulfonyl)propylamino | 5,7-Disulfo-2-aminonaphth-1-yl | bluish red (538) |
| 16 | β-Sulfatoethyl | Formula (3):<br>X = Fluorine,<br>Y = Bis-[β-(β'-chloroethylsulfonyl)ethyl]amino | 5,7-Disulfo-2-aminonaphth-1-yl | bluish red (542) |
| 17 | β-Sulfatoethyl | Formula (3):<br>X = Fluorine,<br>Y = Bis-(β-vinylsulfonylethyl)-amino | 5,7-Disulfo-2-aminonaphth-1-yl | bluish red (540) |
| 18 | β-Chloroethyl | Formula (3):<br>X = Fluorine,<br>Y = Bis-[λ-β'-chloroethylsulfonyl)propyl]amino | 5,7-Disulfo-2-aminonaphth-1-yl | bluish red (543) |
| 19 | β-Sulfatoethyl | Formula (3):<br>X = Chlorine,<br>Y = 4-(β-Sulfatoethylsulfonyl)-phenylamino | 5,7-Disulfo-2-aminonaphth-1-yl | bluish red (546) |
| 20 | β-Sulfatoethyl | Formula (3):<br>X = Chlorine,<br>Y = 3-(β-Sulfatoethylsulfonyl)-phenylamino | 5,7-Disulfo-2-aminonaphth-1-yl | bluish red (544) |
| 21 | β-Sulfatoethyl | Formula (3):<br>X = Chlorine,<br>Y = 2-Methoxy-5-(β-sulfatoethylsulfonyl)phenylamino | 5,7-Disulfo-2-aminonaphth-1-yl | bluish red (547) |
| 22 | β-Sulfatoethyl | Formula (3):<br>X = Chlorine,<br>Y = λ-(β'-Sulfatoethylsulfonyl)-propylamino | 5,7-Disulfo-2-aminonaphth-1-yl | bluish red (542) |
| 23 | β-Sulfatoethyl | Formula (3):<br>X = Chlorine,<br>Y = λ-(β'-Chloroethylsulfonyl)-propylamino | 5,7-Disulfo-2-aminonaphth-1-yl | bluish red (543) |
| 24 | β-Sulfatoethyl | Formula (3):<br>X = Chlorine,<br>Y = λ-(Vinylsulfonyl)propylamino | 5,7-Disulfo-2-aminonaphth-1-yl | bluish red (540) |
| 25 | β-Sulfatoethyl | Formula (3):<br>X = Chlorine,<br>Y = Bis-[β-(β'-chloroethylsulfonyl)ethyl]amino | 5,7-Disulfo-2-aminonaphth-1-yl | bluish red (544) |
| 26 | β-Sulfatoethylsulfonyl | Formula (3):<br>X = Chlorine,<br>Y = Bis-(λ-vinylsulfonylpropyl)-amino | 5,7-Disulfo-2-aminonaphth-1-yl | bluish red (542) |
| 27 | β-Chloroethyl | Formula (3):<br>X = Chlorine,<br>Y = Bis-[λ-(β'-chloroethylsulfonyl)propyl]amino | 5,7-Disulfo-2-aminonaphth-1-yl | bluish red (545) |
| 28 | Vinyl | Formula (3):<br>X = Chlorine,<br>Y = Bis-(λ-vinylsulfonylpropyl)-amino | 5,7-Disulfo-2-aminonaphth-1-yl | bluish red (543) |
| 29 | β-Sulfatoethyl | Formula (3):<br>X = Chlorine,<br>Y = 2-Sulfophenylamino | 5,7-Disulfo-2-aminonaphth-1-yl | bluish red (540) |
| 30 | β-Sulfatoethyl | Formula (3): | 5,7-Disulfo-2-aminonaphth-1-yl | bluish red (543) |

-continued

| Ex. | Radical Y | Radical R | Radical K | Hue |
|---|---|---|---|---|
| 31 | β-Sulfatoethyl | X = Chlorine, Y = 3-Sulfophenylamino Formula (3): X = Chlorine, Y = 4-Sulfophenylamino | 5,7-Disulfo-2-aminonaphth-1-yl | bluish red (544) |
| 32 | β-Sulfatoethyl | Acetyl | 8-(β-Sulfatoethylsulfonyl)-2-aminonaphth-1-yl | reddish brown (509) |
| 33 | β-Sulfatoethyl | Acetyl | 6-Sulfo-8-(β-sulfatoethyl-sulfonyl)-2-aminonaphth-1-yl | brown (514) |
| 34 | β-Sulfatoethyl | Acetyl | 3,6-Disulfo-2-aminonaphth-1-yl | reddish blue (531) |
| 35 | β-Sulfatoethyl | Acetyl | 6,8-Disulfo-2-aminonaphth-1-yl | reddish blue (533) |
| 36 | β-Sulfatoethyl | Acetyl | 5-Sulfo-2-aminonaphth-1-yl | reddish blue (543) |
| 37 | β-Sulfatoethyl | Acetyl | 6-Sulfo-2-aminonaphth-1-yl | reddish blue (544) |
| 38 | β-Sulfatoethyl | Acetyl | 7-Sulfo-2-aminonaphth-1-yl | reddish blue (545) |
| 39 | β-Sulfatoethyl | Acetyl | 8-Sulfo-2-aminonaphth-1-yl | reddish blue (547) |
| 40 | Vinyl | Acetyl | 5,7-Disulfo-2-aminonaphth-1-yl | reddish blue (531) |
| 41 | Vinyl | Acetyl | 6,8-Disulfo-2-aminonaphth-1-yl | reddish blue (536) |
| 42 | Vinyl | Acetyl | 8-Sulfo-6-(β-sulfatoethyl-sulfonyl)-2-aminonaphth-1-yl | reddish brown (515) |
| 43 | Vinyl | Acetyl | 6-Sulfo-8-(β-sulfatoethyl-sulfonyl)-2-aminonaphth-1-yl | brown (516) |
| 44 | Vinyl | Benzoyl | 5,7-Disulfo-2-aminonaphth-1-yl | reddish blue (532) |
| 45 | Vinyl | Benzoyl | 6,8-Disulfo-2-aminonaphth-1-yl | reddish blue (537) |
| 46 | β-Sulfatoethyl | Benzoyl | 5,7-Disulfo-2-aminonaphth-1-yl | reddish blue (531) |
| 47 | β-Sulfatoethyl | Benzoyl | 6,8-Disulfo-2-aminonaphth-1-yl | reddish blue (535) |
| 48 | β-Sulfatoethyl | Benzoyl | 6-(β-Sulfatoethylsulfonyl)-2-aminonaphth-1-yl | violet (532) |
| 49 | β-Sulfatoethyl | Benzoyl | 8-Sulfo-6-(β-sulfatoethyl-sulfonyl)-2-aminonaphth-1-yl | reddish brown (514) |
| 50 | β-Sulfatoethyl | Benzoyl | 6-Sulfo-8-(β-sulfatoethyl-sulfonyl)-2-aminonaphth-1-yl | brown (516) |
| 51 | Vinyl | Formula (3): X = Cyanoamino, Y = 3-Sulfophenylamino | 5,7-Disulfo-2-aminonaphth-1-yl | bluish red (539) |
| 52 | Vinyl | Formula (3): X = Fluorine, Y = 4-(β-Sulfatoethylsulfonyl)-phenylamino | 5,7-Disulfo-2-aminonaphth-1-yl | bluish red (540) |
| 53 | Vinyl | Formula (3): X = Fluorine, Y = λ-(β'-Sulfatoethylsulfonyl)-propylamino | 5,7-Disulfo-2-aminonaphth-1-yl | bluish red (537) |
| 54 | Vinyl | Formula (3): X = Chlorine, Y = 4-(β-Sulfatoethylsulfonyl)-phenylamino | 5,7-Disulfo-2-aminonaphth-1-yl | bluish red (545) |
| 55 | Vinyl | Formula (3): X = Chlorine, Y = Bis-[β-(β'-chloroethyl-sulfonyl)ethyl]amino | 5,7-Disulfo-2-aminonaphth-1-yl | bluish red (546) |

EXAMPLE 56 A

Following the method of Example 1, the monoazo compound is prepared by coupling the diazonium salt obtained from 28.1 parts of 4-(β-sulfatoethylsulfonyl)aniline onto 23 parts of 2-sulfo-5-acetylaminoaniline, diazotizing this aminoazo compound by the method of Example 1, and then adding 15 parts of 2-aminonaphthalene-5,7-disulfonic acid and 16.5 parts of 6-(β-sulfatoethylsulfonyl)-2-aminonaphthalene, adjusting the pH to 4.5 to 5 with sodium carbonate, and bringing the coupling reaction to completion while stirring at about 20° C. is continued.

The mixture according to the invention of the disazo compounds of the formulae (written in the form of the free acid)

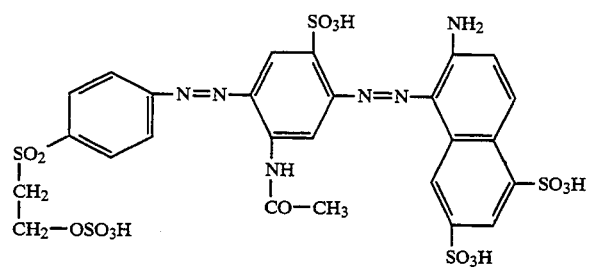

-continued

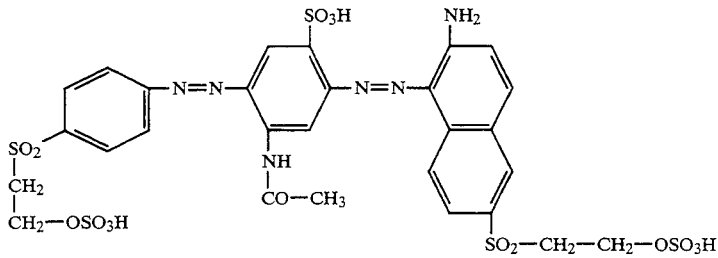

is isolated as the alkali metal salts (sodium salts) by precipitation from the synthesis solution using sodium chloride. The mixture according to the invention produces strong violet dyeings and prints having good fastness properties, of which in particular the good light fastness may be mentioned, on the materials mentioned in the description, such as, in particular, on cotton, by the application and fixation methods customary for fiber-reactive dyes.

EXAMPLE 56 B

To prepare a mixture according to the invention of the dyes of the formulae (1A) and (1B), the method of Example 56 A is followed, except that the second coupling component, 2-aminonaphthalene-5,7-disulfonic acid, is replaced by an equivalent amount of 2-aminonaphthalene-3,6-disulfonic acid to give a mixture of the two disazo compounds described in Examples 2 and 34, which likewise produces strong reddish blue dyeings and prints having good fastness properties on, for example, cotton by the dyeing methods customary for fiber-reactive dyes.

EXAMPLE 56 C

To prepare a mixture according to the invention of the dyes of the formulae (1A) and (1B), the method of Example 56 A is followed, except that the second coupling component, 2-aminonaphthalene-5,7-disulfonic acid, is replaced by an equivalent amount of 2-aminonaphthalene-6,8-disulfonic acid to give a mixture of the two disazo compounds described in Examples 2 and 35, which likewise produces strong reddish blue dyeings and prints having good fastness properties on, for example, cotton by the dyeing methods customary for fiber-reactive dyes.

EXAMPLE 56 D

To prepare a mixture according to the invention of the dyes of the formulae (1A) and (1B), the method of Example 56 A is followed, except that the second coupling component, 2-aminonaphthalene-5,7-disulfonic acid, is replaced by an equivalent amount of 2-aminonaphthalene-5-sulfonic acid to give a mixture of the two disazo compounds described in Examples 2 and 36, which likewise produces strong reddish blue dyeings and prints having good fastness properties on, for example, cotton by the dyeing methods customary for fiber-reactive dyes.

EXAMPLE 56 E

To prepare a mixture according to the invention of the dyes of the formulae (1A) and (1B), the method of Example 56 A is followed, except that the second coupling component, 2-aminonaphthalene-5,7-disulfonic acid, is replaced by an equivalent amount of 2-aminonaphthalene-6-sulfonic acid to give a mixture of the two disazo compounds described in Examples 2 and 37, which likewise produces strong reddish blue dyeings and prints having good fastness properties on, for example, cotton by the dyeing methods customary for fiber-reactive dyes.

EXAMPLE 56 F

To prepare a mixture according to the invention of the dyes of the formulae (1A) and (1B), the method of Example 56 A is followed, except that the second coupling component, 2-aminonaphthalene-5,7-disulfonic acid, is replaced by an equivalent amount of 2-aminonaphthalene-7-sulfonic acid to give a mixture of the two disazo compounds described in Examples 2 and 38, which likewise produces strong reddish blue dyeings and prints having good fastness properties on, for example, cotton by the dyeing methods customary for fiber-reactive dyes.

EXAMPLE 56 G

To prepare a mixture according to the invention of the dyes of the formulae (1A) and (1B), the method of Example 56 A is followed, except that the second coupling component, 2-aminonaphthalene-5,7-disulfonic acid, is replaced by an equivalent amount of 2-aminonaphthalene-8-sulfonic acid to give a mixture of the two disazo compounds described in Examples 2 and 39, which likewise produces strong reddish blue dyeings and prints having good fastness properties on, for example, cotton by the dyeing methods customary for fiber-reactive dyes.

EXAMPLE 57 A

Following the method of Example 1, the monoazo compound is prepared by coupling the diazonium salt obtained from 28.1 parts of 4-($\beta$-sulfatoethylsulfonyl)aniline onto 23 parts of 2-sulfo-5-acetylaminoaniline, diazotizing this aminoazo compound by the method of Example 1, and then adding 15 parts of 2-aminonaphthalene-5,7-disulfonic acid and 16.5 parts of 8-sulfo-6-($\beta$-sulfatoethylsulfonyl)-2-aminonaphthalene, adjusting the pH to 4.5 to 5 with sodium carbonate, and bringing the coupling reaction to completion while stirring at about 20° C. is continued.

The mixture according to the invention of the disazo compounds of the formulae (written in the form of the free acid)

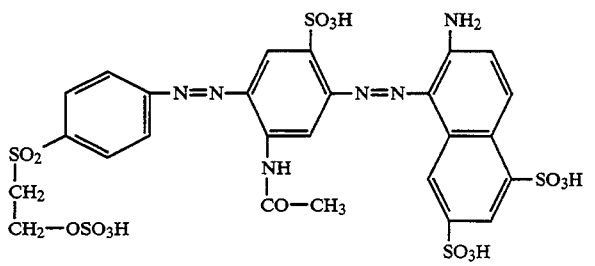

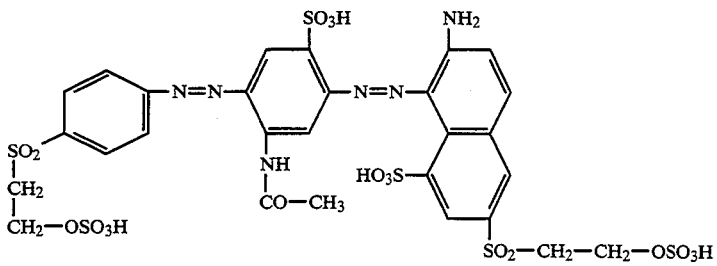

is isolated as the alkali metal salts (sodium salts) by precipitation from the synthesis solution using sodium chloride. The mixture according to the invention produces strong bluish red dyeings and prints having good fastness properties, of which in particular the good light fastness may be mentioned, on the materials mentioned in the description, such as, in particular, on cotton, by the application and fixation methods customary for fiber-reactive dyes.

EXAMPLE 57 B

To prepare a mixture according to the invention of the dyes of the formulae (1A) and (1B), the method of Example 57 A is followed, except that the second coupling component, 8-sulfo-6-(β-sulfatoethylsulfonyl)-2-aminonaphthalene, is replaced by an equivalent amount of 8-(β-sulfatoethylsulfonyl)-2-aminonaphthalene to give a mixture of the two disazo compounds described in Examples 2 and 32, which likewise produces strong bluish red dyeings and prints having good fastness properties on, for example, cotton by the dyeing methods customary for fiber-reactive dyes.

EXAMPLE 57 C

To prepare a mixture according to the invention of the dyes of the formulae (1A) and (1B), the method of Example 57 A is followed, except that the second coupling component, 8-sulfo-6-(β-sulfatoethylsulfonyl)-2-aminonaphthalene, is replaced by an equivalent amount of 6-sulfo-8-(β-sulfatoethylsulfonyl)-2-aminonaphthalene to give a mixture of the two disazo compounds described in Examples 2 and 33, which likewise produces strong bluish red dyeings and prints having good fastness properties on, for example, cotton by the dyeing methods customary for fiber-reactive dyes.

EXAMPLE 58 A 50 parts of the disazo compound according to the invention described in Example 1 and 50 parts of the disazo compound according to the invention described in Example 2 are mixed in a mechanical mixing apparatus until a homogeneous mixture is obtained. The resulting mixture according to the invention dyes the materials mentioned in the description, in particular cotton, in strong violet shades having good fastness properties, of which in particular the good light fastness may be mentioned, by the application and fixation methods customary for fiber-reactive dyes. The mixture essentially has the composition of Example 56 A and exhibits the same properties.

EXAMPLE 58 B

Analogously, mechanical mixing of 50 parts of the disazo compound according to the invention from Example 1 with 50 parts of the disazo compound according to the invention from Examples 34, 35, 36, 37, 38 or 39 gives mixtures of two disazo compounds according to the invention corresponding to the mixtures from Examples 56 B, 56 C, 56 D, 56 E, 56 F and 56 G, respectively.

EXAMPLE 59 A 50 parts of the disazo compound according to the invention described in Example 1 and 50 parts of the disazo compound according to the invention described in Example 3 are mixed in a mechanical mixer until a homogeneous mixture is obtained. The resulting mixture dyes the materials mentioned in the description, in particular cotton, in strong bluish red shades having good fastness properties, of which in particular the light fastness may be mentioned, by the application and fixation methods customary for fiber-reactive dyes. The mixture essentially has the composition of Example 56 A and exhibits the same properties.

EXAMPLE 59 B

Following the method described in Example 59 A, mixtures according to the invention are obtained analogously by mixing the two disazo compounds according to the invention described in Examples 1 and 32 with one another. This mixture according to the invention also produces strong bluish red dyeings and prints having good fastness properties on, for example, cotton by the application methods customary in the art.

EXAMPLE 59 C

Following the method described in Example 59 A, mixtures according to the invention are obtained analogously by mixing the two disazo compounds according to the invention described in Examples 1 and 33 with one another. This mixture according to the invention also produces strong bluish red dyeings and prints having good fastness properties on, for example, cotton by the application methods customary in the art.

What is claimed is:

1. A diazo compound of the formula (1)

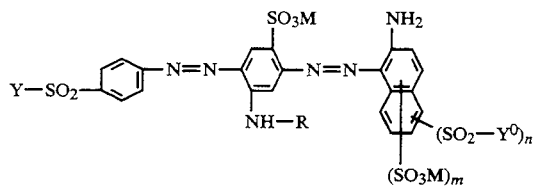

in which

M is hydrogen or an alkali metal;

Y is vinyl or ethyl which is substituted in the β-position by a substituent which is eliminated by reaction with alkali to give the vinyl group;

Y° is vinyl or ethyl which is β-substituted by a substituent which is eliminated by reaction with alkali to give the vinyl group;

m is zero, 1 or 2;

n is zero or 1 (this group being hydrogen if n is zero);

R is a group of the formula (2) or (3)

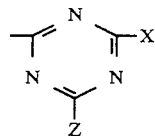

in which $R^4$ is an unsubstituted alkyl of 1 to 6 carbon atoms, or substituted alkyl of 2 to 6 carbon atoms or is unsubstituted phenyl or a phenyl substituted by 1, 2 or 3 substituents wherein the substituent or substituents for the alkyl and phenyl are selected from the group consisting of sulfo, carboxy, alkyl of 1 to 4 carbon atoms and alkoxy of 1 to 4 carbon atoms, X is chlorine, fluorine, hydroxy, alkoxy of 1 to 10 carbon atoms, cycloalkyloxy of 5 to 8 carbon atoms, or alkoxy of 3 to 8 carbon atoms, its alkyl being interrupted by one or two haters groups selected from the group consisting of —O—, —NH—, —CO—NH— and —NH—CO—, or is benzyloxy, sulfomethoxy, β-sulfoethoxy, amine, alkylamino of 1 to 10 carbon atoms, cycloalkylamino of 5 to 8 carbon atoms, or alkylamino of 3 to 8 carbon atoms, its alkyl being interrupted by one or two hetero groups selected from the group consisting of —O—, —NH—, —CO—NH— and —NH—CO—, or is benzylamino, sulfomethylamino, β-sulfoethylamino or cyanoamino, and Z is chlorine, fluorine or a group of the formula (4a), (4b), (4c) or (4d)

—NH—alk—SO$_2$—Y$^1$ (4a)

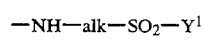

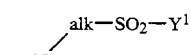

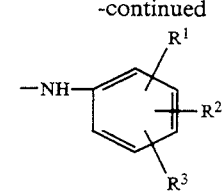

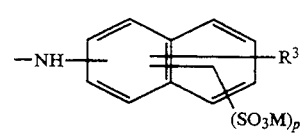

in which alk is alkylene of 1 to 8 carbon atoms, or is alkylene of 3 to 8 carbon atoms which is interrupted by one or two hereto groups selected from the group consisting of —O—, —NH—, —CO—NH— and —NH—CO, Y$^1$ is vinyl or is ethyl which is substituted in the β-position by a substituent which is eliminated by reaction with alkali to give the vinyl group;

R$^1$ is hydrogen, carboxy sulfo or a group of the formula —SO$_2$—Y$^1$ where Y$^1$ has the above mentioned meaning, R$^2$ is hydrogen, alkyl of 1 to 4 carbon atoms, alkoxy of 1 to 4 carbon atoms, chlorine, bromine, carboxy, sulfo or nitro, R$^3$ is hydrogen, alkyl of 1 to 4 carbon atoms, alkoxy of 1 to 4 carbon atoms, chlorine, bromine, carboxy or sulfo, M has one of the above mentioned meanings, and p is 1 or 2, or a mixture of these disazo compounds.

2. A compound as claimed in claim 1, wherein R$^4$ is methyl.

3. A compound as claimed in claim 1, wherein X is chlorine, fluorine or cyanoamino.

4. A compound as claimed in claim 1, wherein Y is β-sulfatoethyl.

5. A compound as claimed in claim 1 of the formula

![formula]

in which M has the meaning given in claim 1.

6. A compound as claimed in claim 1 of the formula

![formula]

in which M has the meaning given in claim 1.

7. A mixture of compounds comprising one or more compounds diazo compounds of the formula (1A) and one or more of the formula (1B)

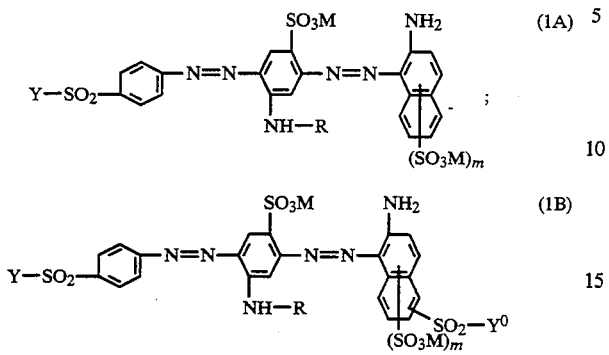

in which

M is hydrogen or an alkali metal;

X is vinyl or ethyl which is substituted in the β-position by a substituent which is eliminated by reaction with alkali to give the vinyl group;

Y° is vinyl or ethyl which is β-substituted by a substituent which is eliminated by reaction with alkali to give the vinyl group;

m is zero, 1 or 3;

m¹ is 1 or 2;

R is a group of the formula (2) or (3)

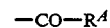

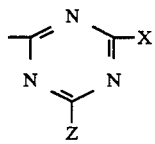

in which

R⁴ is an unsubstituted alkyl of 1 to 6 carbon atoms, or substituted alkyl of 2 to 6 carbon atoms or is unsubstituted phenyl or a phenyl substituted by 1, 2 or 3 substituents wherein the substituent or substituents for the alkyl and phenyl are selected from the group consisting of sulfo, carboxy, alkyl of 1 to 4 carbon atoms and alkoxy of 1 to 4 carbon atoms, X is chlorine, fluorine, hydroxy, alkoxy of 1 to 10 carbon atoms, cycloalkyloxy of 5 to S carbon atoms, or alkoxy of 3 to 8 carbon atoms, its alkyl being interrupted by one or two hetero groups selected from the group consisting of —O—, —NH—, —CO—NH— and —NH—CO—, or is benzyloxy, sulfomethoxy, β-sulfoethoxy, amino, alkylamino of 1 to 10 carbon atoms, cycloalkylamino of 5 to 8 carbon atoms, or alkylamino of 3 to S carbon atoms, its alkyl being interrupted by one or two hetero groups selected from the group consisting of —O—, —NH—, —CO—NH— and —NH—CO—, or is benzylamino, sulfomethylamino, β-sulfoethylamino or cyanoamino, and Z is chlorine, fluorine or a group of the formula (4a), (4b), (4c) or (4d)

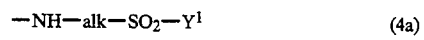

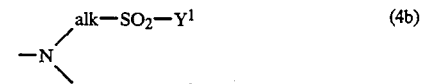

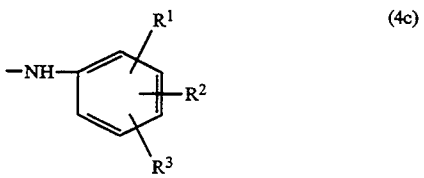

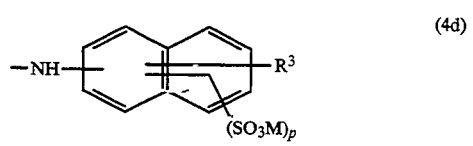

in which alk is alkylene of 1 to 8 carbon atoms, or is alkylene of 3 to 8 carbon atoms which is interrupted by one or two hetero groups selected from the group consisting of —O—, —NH—, —CO—NH— and —NH—CO—, Y¹ is vinyl or is ethyl which is substituted in the β-position by a substituent which is eliminated by reaction with alkali to give the vinyl group;

R¹ is hydrogen, carboxy, sulfo or a group of the formula —SO₂—Y¹ where Y¹ has the above mentioned meaning, R² is hydrogen, alkyl of 1 to 4 carbon atoms, alkoxy of 1 to 4 carbon atoms, chlorine, bromine, carboxy, sulfo or nitro, R³ is hydrogen, alkyl of 1 to 4 carbon atoms, alkoxy of 1 to 4 carbon atoms, chlorine, bromine, carboxy or sulfo, M has one of the above mentioned meanings, and p is 1 or 2, in a mixing ratio of 5:95 to 95:5% by weight.

8. A mixture as claimed in claim 7, comprising one or more disazo compounds of the formula (1A) and one or more disazo compounds of the formula (1B) in a mixing ratio of 30:70 to 70:30% by weight.

9. A mixture as claimed in claim 7, wherein R is in each case acetyl.

10. A mixture as claimed in claim 7, wherein Y is in each case β-sulfatoethyl.

11. A compound as claimed in claim 1, wherein n is 1 and Z is chlorine or fluorine or a group of the formula (4c) in which R¹ is hydrogen, carboxy or sulfo.

* * * * *

UNITED STATES PATENT AND TRADEMARK OFFICE
CERTIFICATE OF CORRECTION

PATENT NO. : 5,405,415
DATED : April 11, 1995
INVENTOR(S) : Reiher et al

It is certified that error appears in the above-indentified patent and that said Letters Patent is hereby corrected as shown below:

In column 19, line 6, the word "diazo" should read --disazo--.

In column 19, line 51, "amine" should read --amino-- thereof.

In column 20, line 24, the phrase "carboxy sulfo" should read --carboxy, sulfo--.

In column 21, line 2, the phrase "compounds diazo compounds" should read --disazo compounds--.

In column 21, line 49, the phrase "5 to S carbon" should read --5 to 8 carbon-- thereof.

In column 21, line 56, the phrase "3 to S carbon" should read --5 to 8 carbon-- thereof.

Signed and Sealed this

Seventeenth Day of October, 1995

Attest:

BRUCE LEHMAN

Attesting Officer  Commissioner of Patents and Trademarks